(12) United States Patent
Nakano

(10) Patent No.: US 7,802,869 B2
(45) Date of Patent: Sep. 28, 2010

(54) PRINTER AND PRINTING METHOD

(75) Inventor: Shinya Nakano, Tomi (JP)

(73) Assignee: Mimaki Engineering Co., Ltd., Nagano (JP)

( * ) Notice: Subject to any disclaimer, the term of this patent is extended or adjusted under 35 U.S.C. 154(b) by 495 days.

(21) Appl. No.: 11/941,843

(22) Filed: Nov. 16, 2007

(65) Prior Publication Data

US 2009/0174740 A1    Jul. 9, 2009

(30) Foreign Application Priority Data

Nov. 24, 2006    (JP)    ............... 2006-316680

(51) Int. Cl.
*B41J 29/38* (2006.01)
*B41J 2/145* (2006.01)
*B41J 2/15* (2006.01)

(52) U.S. Cl. ............... 347/41; 347/12; 347/40

(58) Field of Classification Search ............ 347/12, 347/40, 41
See application file for complete search history.

(56) References Cited

U.S. PATENT DOCUMENTS 5,488,397 A * 1/1996 Nguyen et al. ............ 347/40

6,394,579 B1 * 5/2002 Boyd et al. ............ 347/47
6,832,823 B1 * 12/2004 Askeland et al. ......... 347/14
2005/0168503 A1 * 8/2005 Mitsuzawa ............ 347/5

FOREIGN PATENT DOCUMENTS

JP    2001-001510    1/2001

* cited by examiner

*Primary Examiner*—Julian D Huffman
(74) *Attorney, Agent, or Firm*—Ditthavong Mori & Steiner, P.C.

(57) ABSTRACT

An inkjet printer includes a printing head having nozzle units, a main scanning control unit, a sub scanning control unit, and a printing pass setting unit. Each nozzle unit includes a nozzle array where the nozzles are arranged in a nozzle array direction. The main scanning control unit makes the printing head to scan in a main scanning direction while the nozzle units discharge ink drops. The sub scanning control unit relatively moves the printing head with respect to the medium in a sub scanning direction. The printing pass setting unit correlates each of the nozzles with each of multiple printing passes to be printed at once by a scanning of the printing head in the main scanning direction, and sets discharging nozzles among the nozzles to discharge ink drops to the printing passes not to overlap boundaries of the printing passes with boundaries of the nozzle units.

4 Claims, 4 Drawing Sheets

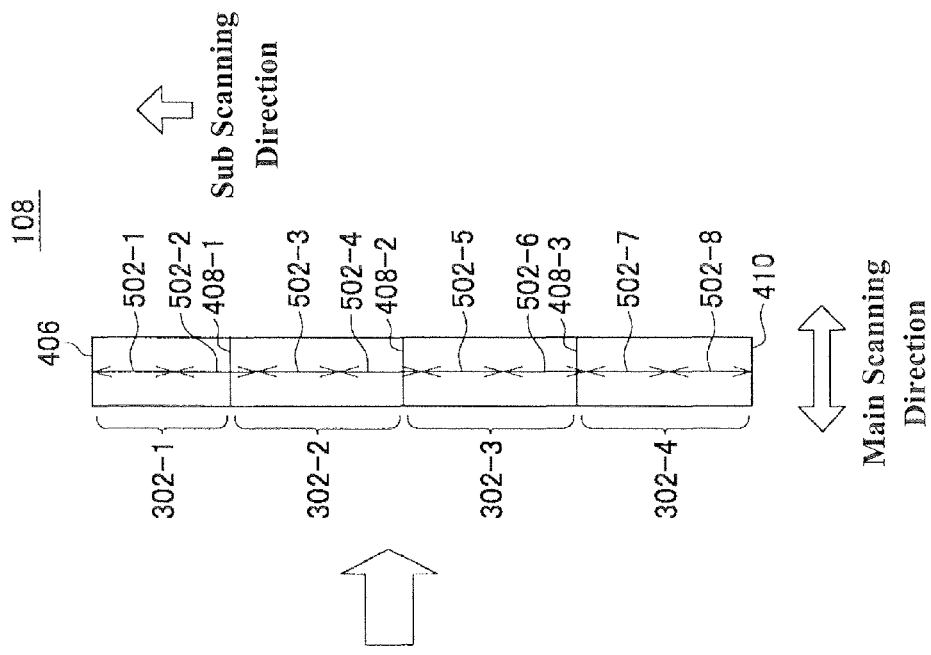
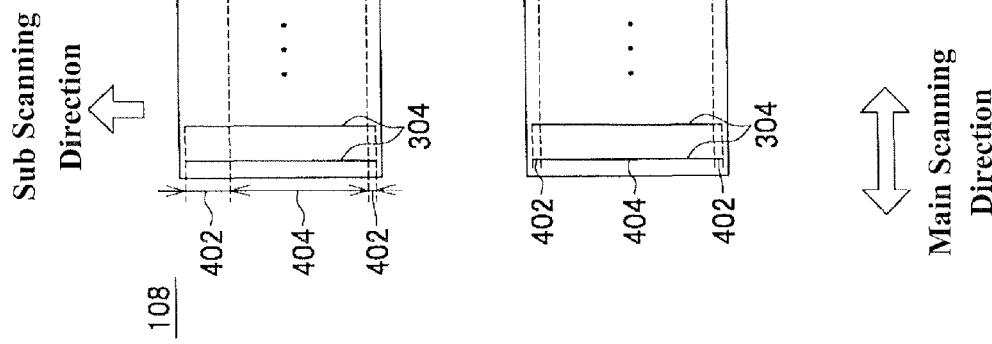

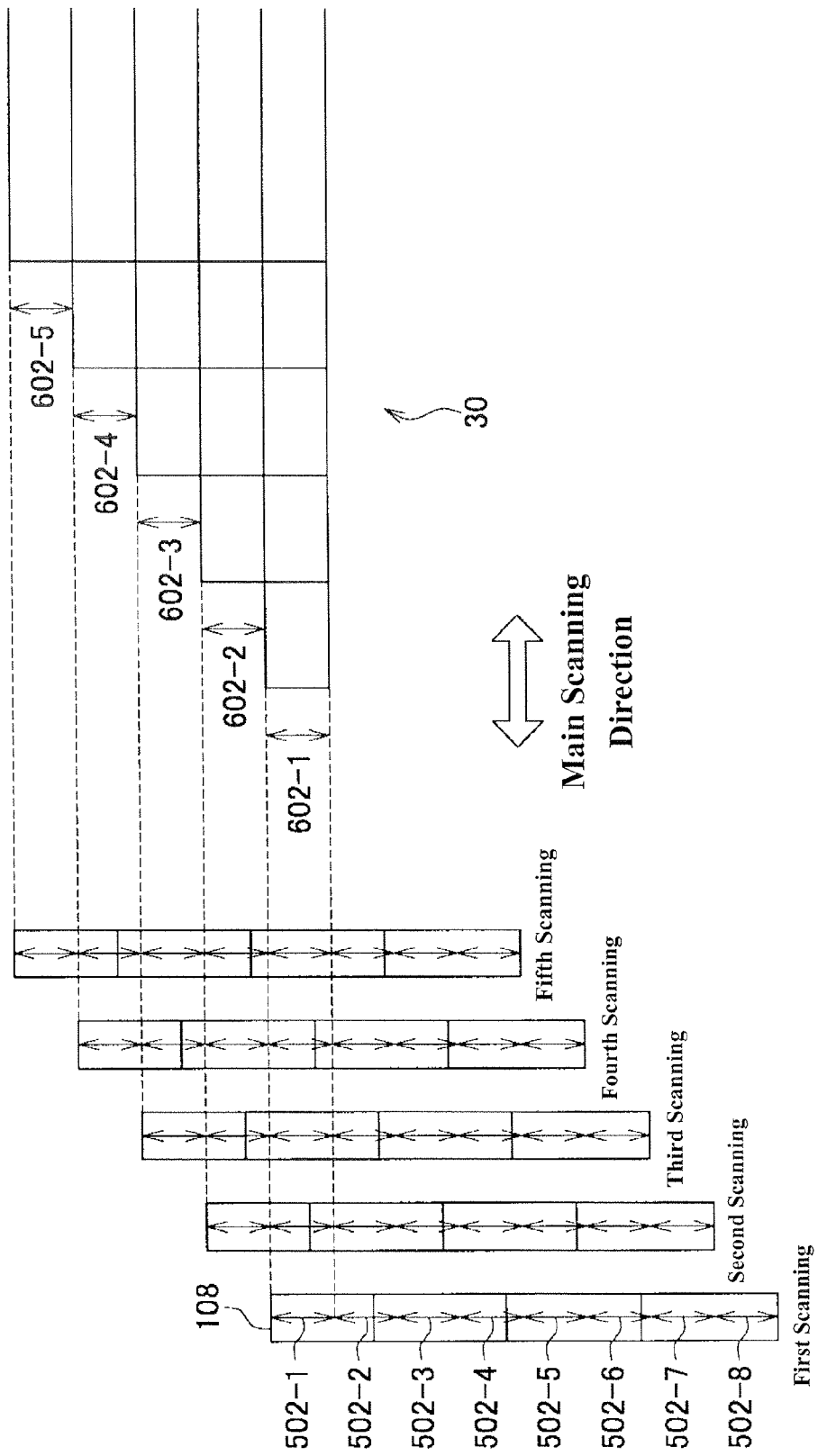

PRINTER AND PRINTING METHOD

CROSS-REFERENCE TO RELATED APPLICATIONS

The present application claims priority under 35 U.S.C. §119 to Japanese Patent Application No. 2006-316680, filed Nov. 24, 2006, entitled "Printer and printing method." The contents of this application are incorporated herein by reference in their entirety.

BACKGROUND OF THE INVENTION

1. Field of the Invention

The present invention relates to a printer and a printing method.

2. Discussion of the Background

Conventionally, Japanese Patent No. 3702711 discloses a printer using a collective head composed of a plurality of nozzle units. In this printer, the plurality of nozzle units are arranged, for example, such that at least one nozzle at the end of one nozzle unit and a nozzle at the end of other nozzle unit overlap in the direction intersecting the nozzle arrays.

There is a problem with the collective head that print quality can deteriorate at a boundary (seam) between nozzle units due to differences in assembling tolerance of the units. For this, in the printer of Japanese Patent No. 3702711, a raster is formed by mixing ink dots of the nozzle units at the overlapped portion of the nozzle units, thereby preventing the deterioration of print quality. The contents of Japanese Patent No. 3702711 are incorporated herein by reference in their entirety.

Recently, for satisfying the demand of increased printing resolution, a printer is sometimes employed which conducts printing on respective positions of a medium by means of multiple printing passes. As compared to a case using an inkjet head composed of a single head unit, for example, the aforementioned printing has larger possibility of producing black streaks as darker color portions than the other portions or white steaks as lighter color portions than the other portions at positions of boundaries of the printing passes. With such black steaks and/or white steaks, banding that is a series of bands running as trucks of printing passes occurs, thus deteriorating the print quality.

SUMMARY OF THE INVENTION

According to one aspect of the present invention, an inkjet printer includes a printing head, a main scanning control unit, a sub scanning control unit, and a printing pass setting unit. The printing head has a plurality of nozzle units. Each of the nozzle units includes a nozzle array in which a plurality of nozzles are arranged in a nozzle array direction. The main scanning control unit is configured to make the printing head to scan in a main scanning direction substantially perpendicular to the nozzle array direction while the nozzle units discharge ink drops. The sub scanning control unit is configured to relatively move the printing head with respect to the medium in a sub scanning direction substantially perpendicular to the main scanning direction. The printing pass setting unit is configured to correlate each of the nozzles with each of multiple printing passes to be printed at once by a scanning of the printing head in the main scanning direction, and configured to set discharging nozzles among the nozzles to discharge ink drops to the printing passes not to overlap boundaries of the printing passes with boundaries of the nozzle units.

According to another aspect of the invention, a method for inkjet printing includes providing a printing head, making the printing head to scan in a main scanning direction while the nozzle units discharge ink drops, and relatively moving the printing head with respect to the medium in a sub scanning direction substantially perpendicular to the main scanning direction. The printing head has a plurality of nozzle units. Each of the nozzle units includes a nozzle array in which a plurality of nozzles are arranged in a nozzle array direction. The main scanning direction is substantially perpendicular to the nozzle array direction. The method further includes correlating each of the nozzles with each of multiple printing passes to be printed at once by a scanning of the printing head in the main scanning direction, and setting discharging nozzles among the nozzles to discharge ink drops to the printing passes not to overlap boundaries of the printing passes with boundaries of the nozzle units.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 2a-2b are illustrations showing a structural example of a collective head 108 in detail, where FIG. 2a shows an example of arrangement of a plurality of nozzle units 302 belonging to the collective head 108 and FIG. 2b is an illustration showing a positional relation between multiple printing passes 502 printed at once by one scanning action and the plurality of nozzle units 302;

FIG. 4 is a schematic illustration showing the outline of printing actions in the example.

DESCRIPTION OF THE EMBODIMENTS

Figure 1:
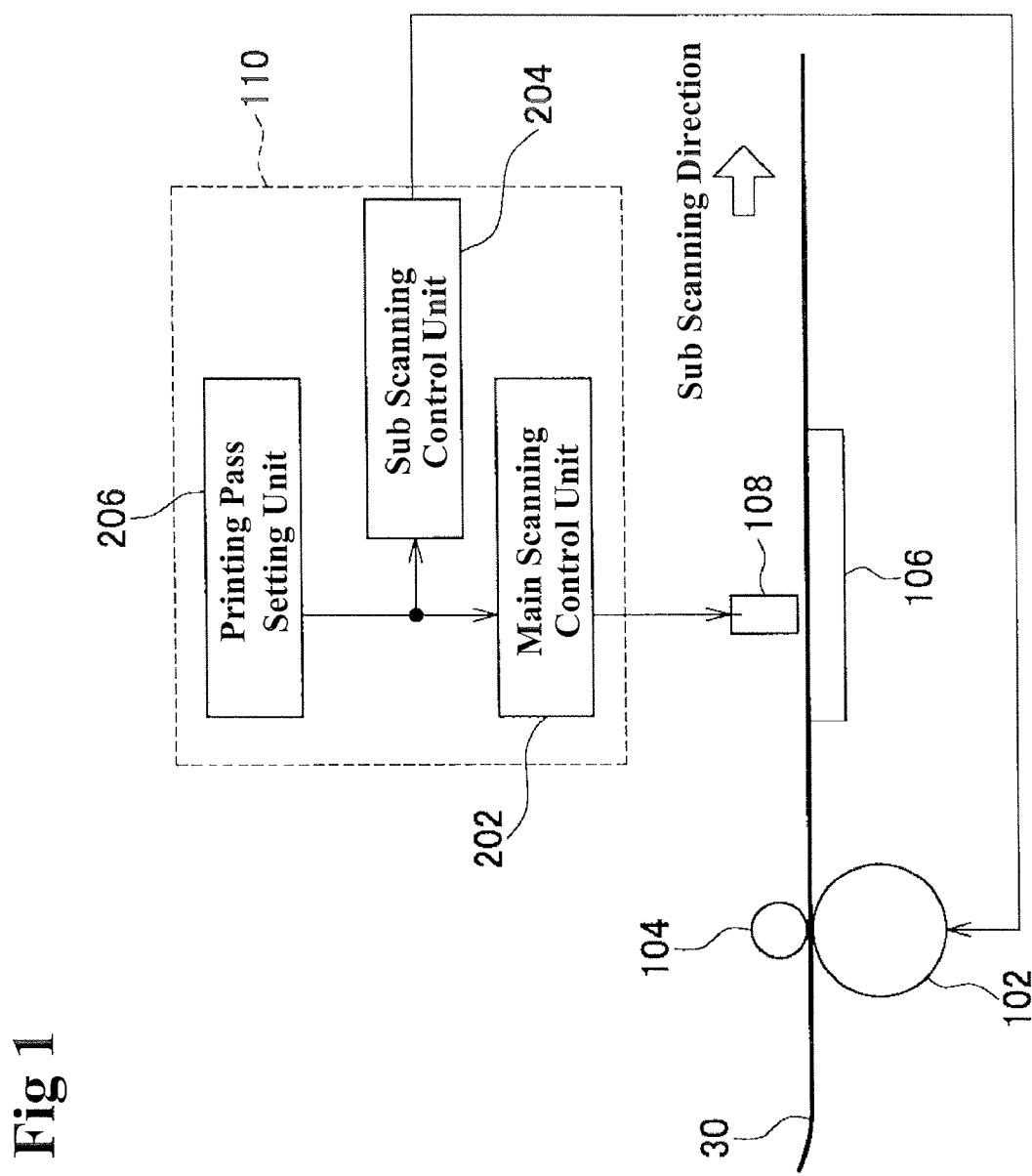
FIG. 1 is an illustration showing a structural example of a printer 10 according to an embodiment of the present invention.

The embodiments will now be described with reference to the accompanying drawings, wherein like reference numerals designate corresponding or identical elements throughout the various drawings.

FIG. 1 shows a structural example of a printer 10 according to an embodiment of the present invention. The printer 10 is an inkjet printer employing a multi-pass printing method. That is, the printer 10 conducts printing on respective positions of a medium 30 by means of multiple printing passes. In this example, the printer 10 includes a collective head 108, a driving roller 102, a driven roller 104, a table 106, and a print control unit 110.

The collective head 108 is an inkjet head (staggered head) having a plurality of nozzle units each having nozzle arrays in which a plurality of nozzles are aligned. The collective head 108 ejects ink drops on the medium 30 with scanning on the medium 30 in a predetermined main scanning direction according to commands of the print control unit 110.

The driving roller 102 is a roller which rotates according to commands of the print control unit 110. The driven roller 104 is a roller which cooperates with the driving roller 102 to hold the medium 30 therebetween and rotates according to the rotation of the driving roller 102. Therefore, the driving roller 102 and the driven roller 104 feed the medium 30 in a feeding direction perpendicular to the main scanning direction on the medium 30 according to commands of the print control unit 110. The table 106 is located to face the collective head 108 via the medium 30 and holds the medium 30 which is fed to the position corresponding to the collective head 108 by adsorption for example.

The print control unit 110 includes a main scanning control unit 202, a sub scanning control unit 204, and a printing pass setting unit 206. The main scanning control unit 202 controls the scanning action making the nozzles of the collective head 108 to eject ink drops while moving the collective head 108 in the main scanning direction. The sub scanning control unit 204 controls the feeding of the medium 30 in the feeding direction. In this example, the sub scanning control unit 204 moves the collective head 108 relative to the medium in the sub scanning direction opposite to the feeding direction of the medium 30 by making the driving roller 102 and the driven roller 104 to feed the medium 30 in the feeding direction. The printing pass setting unit 206 sets the multiple printing passes to be printed by the scanning of the collective head 108 in the main scanning direction.

In this example, the printing pass setting unit 206 sets the multiple printing passes each having a predetermined fixed bandwidth. The sub scanning control unit 204 sets the feeding distance for each cycle equal to the bandwidth of the printing passes and makes the driving roller 102 and the driven roller 104 to repeat the feeding of the medium 30. The main scanning control unit 202 makes the collective head 108 to conduct scanning action in the intervals between the feedings of the medium 30 by the driving roller 102 and the driven roller 104. Accordingly, the printer 10 repeats the feeding action of the medium 30 and the scanning action, thereby achieving printing on the medium 30 in the multi-pass method.

FIGS. 2a, 2b show an example of detailed structure of the collective head 108. FIG. 2a shows an example of the arrangement of the plurality of nozzle units 302 belonging to the collective head 108. In this example, the collective head 108 has four nozzle units 302-1 through 302-4 which are arranged in zigzag fashion such that the respective end portions in the sub scanning direction are overlapped with each other. The nozzle unit 302-1 is the forefront nozzle unit in the sub scanning direction. The nozzle units 302-2 through 302-4 are nozzle units following the nozzle unit 302-1 in the sub scanning direction in this order.

The nozzle units 302 are nozzle units of the same shape having the same number of nozzles and each have nozzle arrays 304 in which a plurality of nozzles are aligned in the sub scanning direction. The number of nozzles in each nozzle array 304 is, for example, in a range from 650 to 750. In this example, each nozzle unit 302 has a plurality of nozzle arrays 304 arranged in the main scanning direction. The plurality of nozzle arrays 304 eject ink drops of different colors, respectively, for example.

To the collective head 108, the printing pass setting unit 206 (see FIG. 1) divides the nozzle arrays 304 of each nozzle unit 302 into dummy areas 402 set at one end and the other end and an ink ejection area 404 between the two dummy areas 402. The nozzles in the dummy areas 402 are set as dummy nozzles which do not eject ink drops by software for example.

In this embodiment, the printing pass setting unit 206 sets the dummy area 402 on the forward side in the sub scanning direction of the nozzle unit 302-1 to be larger than any of the other dummy areas 402. The size of the dummy area 402 is the length of the dummy area 402 in the sub scanning direction. The printing pass setting unit 206 sets the dummy area 402 on the backward side of the nozzle unit 302-1 and the dummy areas 402 of the other nozzle units 302-2 through 302-3 to have equal width.

Accordingly, the printing pass setting unit 206 sets the number of the dummy nozzles in the dummy area 402 on the forward side in the sub scanning direction of the nozzle unit 302-1 to be larger than the number of the dummy nozzles in each of the other dummy areas 402. The number of the dummy nozzles set in the dummy area 402 on the forward side in the sub scanning direction of the nozzle unit 302-1 is about 20, preferably in a range from 10 to 30, for example. With this arrangement, reduction in printing throughput due to the increase of the dummy nozzles can be prevented and the effect of increase in number of the dummy nozzles can be exhibited to the setting of the printing passes as will be described later. The number of the dummy nozzles set in each of the other dummy areas 402 is preferably in a range from 0 to 2, for example.

The plurality of nozzle units 302-1 through 302-4 each having the dummy areas 402 and the ink ejection area 404 set therein are arranged such that the respective ink ejection areas 404 become continuous with each other in the sub scanning direction. Therefore, the collective head 108 is allowed to function as a large-size head having long nozzle arrays having a continuous length of the ink ejection areas 404 of the plurality of nozzle units 302-1 through 302-4.

In the entire collective head 108, the forefront in the sub scanning direction of the ink ejection area 404 of the nozzle unit 302-1 is the top 406 in the nozzle arrays which eject ink drops. The boundaries between the tail in the sub scanning direction in the ink ejection area 404 of each of the nozzle units 302-1 through 302-3 and the top in the sub scanning direction in the ink ejection areas 404 of each of the nozzle units 302-2 through 302-4 are boundaries 408-1 through 408-3 between two among the nozzle units 302. In the entire collective head 108, the tail in the sub scanning direction in the ink ejection area 404 of the nozzle unit 302-4 is the rear end 410 of the arrays of nozzles which eject ink drops.

FIG. 2b is an illustration showing the positional relation between the multiple printing passes 502 printed at once by one scanning action and the plurality of nozzle units 302, showing relations between the positions of the multiple printing passes 502 and the nozzle arrays formed by continuing the ink ejection areas 404 in the nozzle arrays 304 of the respective nozzle units 302, assuming the collective head 108 as a single large-size head. In this example, the printing pass setting unit 206 sets, as the multiple printing passes 502 printed at once by one scanning action, eight printing passes 502-1 through 502-8 of which number is twice as the number of the nozzle units 302.

To the nozzles in the ink ejection areas 404 of the respective nozzle units 302, the printing pass setting unit 206 correlates a part of nozzle arrays in a bandwidth, which corresponds to the width of the printing pass 502, with each printing pass sequentially from the top 406 as one end of the nozzle arrays in the collective head 108. Therefore, the printing pass setting unit 206 sets nozzles for ejecting ink drops to each printing pass 502 by correlating the multiple printing passes 502-1 through 502-8 with nozzles in the nozzle units 302.

As described in the above using FIG. 2a, in this example, the printing pass setting unit 206 sets the dummy area 402 on the forward side in the sub scanning direction of the nozzle unit 302-1 to be larger than any of the other dummy areas 402. In this case, the number of nozzles contained in the dummy area 402 on the forward side in the sub scanning direction of the nozzle unit 302-1 is larger than the number of nozzles contained in any of the other dummy areas 402 and the ink ejection area 404 of the nozzle unit 302-1 is smaller than the ink ejection area 404 of any of the other nozzle units 302-2 through 302-4.

By setting the printing passes 502-1 through 502-8 sequentially from the top 406 under the aforementioned condition, for example, nozzles for printing the second printing pass 205-2 belong to two nozzle units 302-1 and 302-2 over the boundary 408-1. Accordingly, the boundary between the nozzle units 302-1 and 302-2 is not overlapped with the boundary of the printing passes 502.

Similarly, nozzles for printing the fourth printing pass 502-4 from the top belong to two nozzle units 302-2 and 302-3 over the boundary 408-2. Nozzles for printing the sixth printing pass 502-6 from the top belong to two nozzle units 302-3 and 302-4 over the boundary 408-3. Therefore, the boundary 408-3 between the nozzle units 302-3 and 302-4 is not overlapped with the boundary of the printing passes 502.

The printing pass setting unit 206 of this example sets the printing passes 502 not to overlap the boundaries of the printing passes 502 with the boundaries 408 of the nozzle units 302. Accordingly, for example, even when the boundaries 408 of the nozzle units 302 or the boundaries of the printing passes 502 have a slight effect on the print result, the effect is never increased due to synergistic effect. Therefore, this example prevents, for example, generation of black steaks and white steaks at positions corresponding to the boundaries of the printing passes 502. This also suitably prevents deterioration of print quality.

It should be noted that the number of the nozzle units 302 in the collective head 108 and the number of the printing passes 502 to be set may be suitably changed. The number of printing passes 502 to be printed at once by one scanning action is preferably an integral (for example, 1, 2, 3 . . . ) multiple of the number of the nozzle units 302. This arrangement facilitates the system design, for example.

For example, the printing pass setting unit 206 may set, as the printing passes 502 to be printed at once by one scanning action, "N×k" printing passes 502 of which number is a number obtained by multiplying the number N ("N" is an integer not smaller than 2, i.e. 2, 3, . . . ) of the nozzles by "k" ("k" is an integer not smaller than 1, i.e. 1, 2, 3, . . . ). In this case, the printing pass setting unit 206 sets the multiple printing passes 502 such that, for example, to regard to all of integers "i" not smaller than 1 and not greater than "N−1", nozzles for printing the "i×k"-th printing pass from the foremost end of the collective head 108 belong to two adjacent nozzle units 302 over the boundary between the nozzle units 302. According to this arrangement, the boundaries 408 of the nozzle units 302 and the boundaries of the printing passes 502 are suitably shifted from each other.

The printing pass setting unit 206 may change the number of the printing passes 502 by control of software, for example. In this case, according to the changed number of the printing passes 502, the printing pass setting unit 206 changes the size of the dummy area 402 on the forward side in the sub scanning direction of the first nozzle unit 302-1 to change the number of the dummy nozzle set in the dummy area 402.

Figure 3:
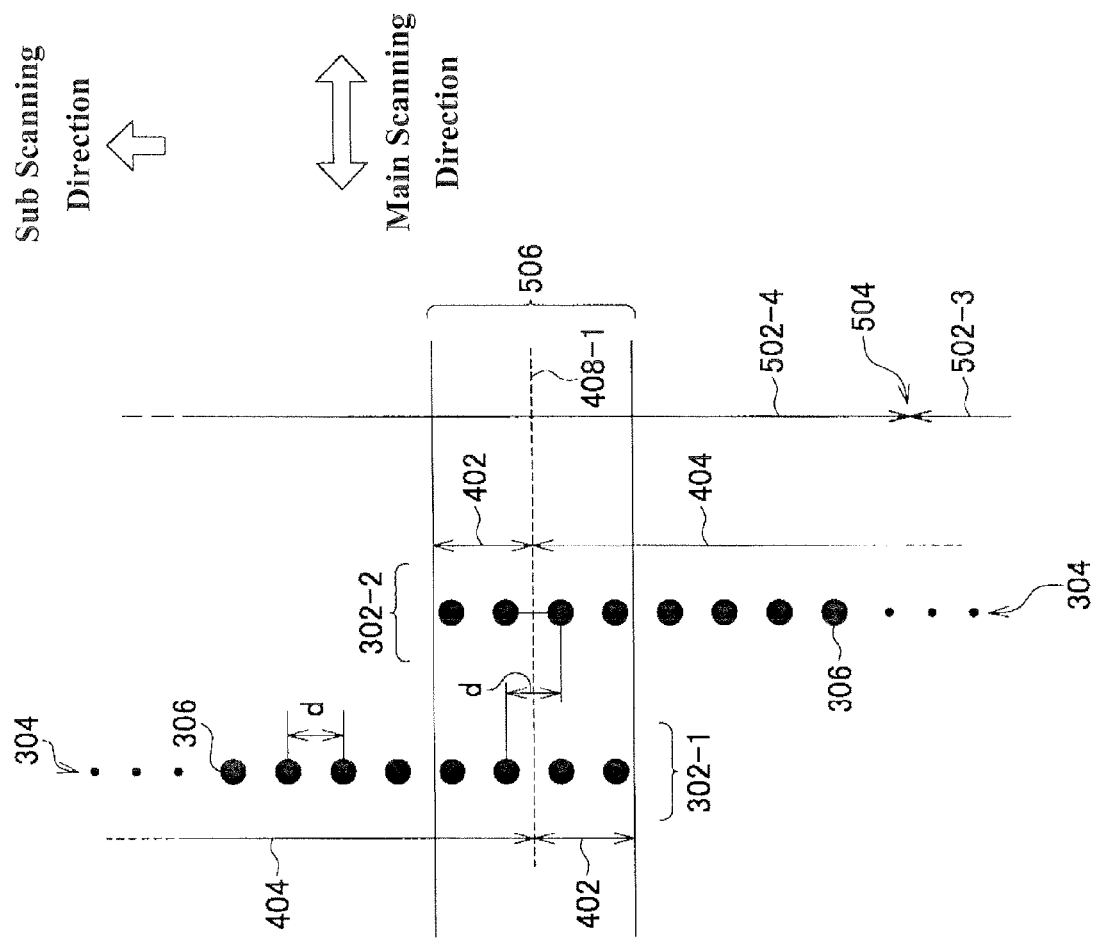
FIG. 3 is an illustration for explaining further in detail a portion near the boundary 408-1 between the nozzle units 302-1 and 302-2.

FIG. 3 is an illustration for explaining an area near the boundary 408-1 between the nozzle units 302-1 and 302-2. For simplifying the description, only one of the nozzle arrays 304 of each of the nozzle units 302-1 and 302-2 is shown. Areas near the other boundaries 408-2 and 408-3 of the nozzle unit 302-2 through 302-4 have the same structure as will be described below.

In the nozzle array 304 of each of the nozzle units 302-1 and 302-2, nozzles 306 are aligned at even intervals "d". The nozzle units 302-1 and 302-2 are shifted in the main scanning direction and arranged in the sub scanning direction such that the interval between the nozzle 306 at the end on the nozzle unit 302-2 side in the ink ejection area 404 of the nozzle unit 302-1 and the nozzle 306 at the end on the nozzle unit 302-1 side of the ink ejection area 404 of the nozzle unit 302-2 is equal to the interval "d". According to this arrangement, even at the boundary 408-1 between the nozzle units 302-1 and 302-2, the interval between the nozzles 306 in the sub scanning direction can be maintained to be constant.

The nozzle units 302-1 and 302-2 are arranged such that the dummy area 402 of the nozzle unit 302-1 is overlapped with an end portion of the ink ejection area 404 of the nozzle unit 302-2 and the dummy area 402 of the nozzle unit 302-2 is overlapped with an end portion of the ink ejection area 404 of the nozzle unit 302-1. In this example, therefore, the nozzles 306 at end portions of the respective nozzle arrays 304 of the nozzle units 302-1 and 302-2 are overlapped with each other in the main scanning direction.

To the arrangement as mentioned above, the printing pass setting unit 206 of this example sets the printing passes 502 not to overlap the boundary 504 between the printing passes 502 with the boundary 506 where the nozzles 306 are overlapped between the nozzle units 302. This arrangement prevents generation of a synergistic effect of the effect of the boundary 408 between the nozzle units 302 and the effect of the boundary 504 between the printing passes 502. This also prevents, for example, occurrence of black steaks and/or white steaks at positions corresponding to the boundaries 504 between the printing passes 502, thus preventing deterioration in print quality.

FIG. 4 is a schematic illustration showing the outline of printing actions in this example. In this example, the collective head 108 conducts printing by repeating movement relative to the medium 30 in the sub scanning direction and scanning movement in the main scanning direction. Hereinafter, the outline of the printing actions will be described.

First, at a position where the first printing pass 502-1 in the sub scanning direction among the plurality of printing passes 502-1 through 502-8 to be printed at once and an area 602-1 of a predetermined bandwidth of the medium 30 are overlapped, for example, the collective head 108 conducts a scanning action (the first scanning). After this scanning action, the collective head 108 moves relative to the medium 30 in the sub scanning direction for one bandwidth.

Accordingly, the collective head 108 moves to a position where the first printing pass 502-1 and the next area 602-2 are overlapped and the second printing pass 502-2 and the area 602-1 are overlapped. At this position, the collective head 108 conducts a next scanning action (the second scanning).

After this, the collective head 108 repeats the movement in the sub scanning direction and the scanning action, whereby the collective head 108 conducts respective scanning actions (the third through fifth scanning) by overlapping the areas 602-3 through 602-5 with the first printing pass 502-1. According to this example, the printer 10 employing the collective head 108 can suitably conduct printing by the plurality of printing passes 502. As clearly seen from the drawings, the boundaries of the nozzle units 302 (see FIGS. 2a, 2b) and the boundaries of the printing passes 502 can be suitably shifted.

According to the embodiment of the present invention, deterioration in print quality can be prevented, for example, in case of conducting printing by means of multiple printing passes in a printer employing a collective head. The details are as follows.

According to the embodiment of the present invention, arranging boundaries of nozzle units to be shifted from boundaries of printing passes is effective in avoiding such black steaks and white steaks at the boundaries of the printing passes. This is attributed to the fact that even when each of the condition of the boundaries of the nozzle units and the condition of the boundaries of the printing passes does not affect the print quality, overlapping between them generates a synergistic effect so as to produce black steaks and/or white steaks.

For example, in a printer using a collective head, a particular situation different from that of the other portions, such as a situation that the ejection of ink drops from the nozzle is speeded up, may occur at the boundaries of the nozzle units. Accordingly, if the boundaries of the nozzle units are overlapped with the boundaries of the printing passes, the boundaries of the printing passes are emphasized so as to produce black steaks and/or white steaks. For this, the present invention has the following arrangements to solve the aforementioned problem.

According to the embodiment of the present invention, the boundaries of the nozzle units and the boundaries of the printing passes are shifted from each other. Thus, generation of a synergistic effect of the effects of both boundaries is prevented. Accordingly, for example, even when the boundaries of the nozzle units or the boundaries of the printing passes have a slight effect on the print result, black steaks and white steaks are hardly produced at positions corresponding to the boundaries of the printing passes. Thus, this arrangement suitably prevents deterioration in print quality during printing conducted by means of multiple printing passes in the printer employing the collective head.

As for the alignment of the nozzles other than the dummy nozzles the plurality of nozzle units in the collective head are aligned in the sub scanning direction such that the interval between a nozzle at an end of one of adjacent nozzle units and a nozzle at an end of the other nozzle unit is equal to the interval between adjacent nozzles in a nozzle array in the nozzle unit. The dummy nozzles are nozzles which are set by, for example, software not to eject ink drops.

According to the embodiment of the present invention, in the collective head, the plurality of nozzle units are arranged such that at least one nozzles at ends of the respective nozzle units are overlapped with each other, and the printing pass setting unit sets the printing passes not to overlap areas, where the nozzles are overlapped between the plurality of nozzle units, with the boundaries of the printing passes.

This arrangement suitably prevents the effect of the boundaries of the nozzle units and the effect of the boundaries of the printing passes from being interacting with each other. This also prevents occurrence of black steaks and/or white steaks at positions corresponding to the boundaries of the printing passes, thus preventing deterioration of print quality due to the black steaks and/or white steaks.

It should be noted that in the area where the nozzles are overlapped with each other in the main scanning direction between the nozzle units, one of the overlapped nozzles is set as a dummy nozzle and only the other nozzle ejects ink drops. Alternatively, the overlapped nozzles may eject ink drops alternately.

According to the embodiment of the present invention, each of the nozzle units has the same number of the nozzles, the number of the printing passes to be printed at once by the scanning of the collective head in the main scanning direction is an integral multiple of the number of the nozzle units belonging to the collective unit, and the printing pass setting unit sets a part of the nozzles at the ends of the nozzle arrays in the nozzle units as dummy nozzles which do not eject ink drops and sets the number of the dummy nozzles of the nozzle unit at the foremost end to be greater than the number of the dummy nozzles of each of the other nozzle units.

According to this arrangement, a plurality of printing passes of which boundaries are not overlapped with the boundaries of the nozzle units can be suitably set. This also further suitably prevents the effect of the boundaries of the nozzle units and the effect of the boundaries of the printing passes from being interacting with each other.

It should be noted that the number of dummy nozzles in the nozzle units other than the nozzle unit at the foremost end may be, for example, 0. The printing pass setting unit sets dummy nozzles at both ends of the nozzle arrays of the respective nozzle units. In this case, the printing pass setting unit preferably sets the number of dummy nozzles on a side distant from the other nozzle unit of the nozzle array of the nozzle unit to be greater than the number of dummy nozzles on an end of the nozzle array of the other nozzle unit.

A method for inkjet printing according to the embodiment of the present invention, the same effects as discussed for the inkjet printer can be obtained.

Though the present invention has been described with regard to the embodiment, the technical scope of the present invention is not limited to the scope described in the aforementioned embodiment. It will be apparent to those skilled in the art that various modifications and improvements can be applied to the aforementioned embodiment. It should be understood that embodiments with such modifications and improvements are within the technical scope of the present invention from teaching of the claims of the present invention.

What is claimed as new and is desired to be secured by Letters Patent of the United States is:

1. An inkjet printer comprising:
   a printing head having a plurality of discrete nozzle units each including a nozzle array in which a plurality of nozzles are arranged in a nozzle array direction;
   a main scanning control unit configured to make the printing head scan in a main scanning direction substantially perpendicular to the nozzle array direction while the nozzle units discharge ink drops;
   a sub scanning control unit configured to relatively move the printing head with respect to the medium in a sub scanning direction substantially perpendicular to the main scanning direction; and
   a printing pass setting unit configured to correlate each of the nozzles with each of multiple printing passes to be printed at once by a scanning of the printing head in the main scanning direction, and configured to set discharging nozzles among the nozzles to discharge ink drops to the printing passes so as to not overlap boundaries of the printing passes with boundaries of the nozzle units.

2. The printer as claimed in claim 1, wherein the plurality of nozzle units are arranged such that at least one nozzle at ends of the respective nozzle units are overlapped with each other, and wherein the printing pass setting unit is configured to set the printing passes so as to not overlap the boundaries of the printing passes with areas where the nozzles are overlapped between the plurality of nozzle units.

3. The printer as claimed in claim 1,
   wherein each of the nozzle units has a same number of the nozzles,
   wherein a number of the printing passes to be printed at once by the scanning of the printing head in the main scanning direction is an integral multiple of a number of the nozzle units, and
   wherein the printing pass setting unit is configured to set nozzles at the ends of the nozzle arrays in the nozzle units as dummy nozzles which do not discharge ink drops and sets a number of the dummy nozzles of the nozzle unit at a foremost end to be greater than a number of the dummy nozzles of each of the other nozzle units so as to set a number of the nozzles which discharge ink drops of the nozzle unit at a foremost end to be smaller than that of each of the other nozzle units.

4. A method for inkjet printing comprising:

providing a printing head having a plurality of discrete nozzle units each including a nozzle array in which a plurality of nozzles are arranged in a nozzle array direction;

making the printing head to scan in a main scanning direction substantially perpendicular to the nozzle array direction while the nozzle units discharge ink drops;

relatively moving the printing head with respect to the medium in a sub scanning direction substantially perpendicular to the main scanning direction;

correlating each of the nozzles with each of multiple printing passes to be printed at once by a scanning of the printing head in the main scanning direction; and setting discharging nozzles among the nozzles to discharge ink drops to the printing passes so as to not overlap boundaries of the printing passes with boundaries of the nozzle units.

\* \* \* \* \*